(12) United States Patent
Oles et al.

(10) Patent No.: US 6,170,368 B1
(45) Date of Patent: Jan. 9, 2001

(54) DETACHABLE CHIPBREAKER FOR A CUTTING INSERT

(75) Inventors: Edward J. Oles, Ligonier; John J. Prizzi, Greensburg, both of PA (US)

(73) Assignee: Kennametal Inc., Latrobe, PA (US)

( * ) Notice: Under 35 U.S.C. 154(b), the term of this patent shall be extended for 0 days.

(21) Appl. No.: 09/250,068

(22) Filed: Feb. 12, 1999

(51) Int. Cl.[7] ............................. B23B 1/00; B23B 27/22
(52) U.S. Cl. ..................... 82/1.11; 82/2; 82/3; 82/6; 82/115
(58) Field of Search ................. 82/1.11; 407/2, 407/3, 4, 5, 6, 103, 102, 101, 114, 115, 100

(56) References Cited

U.S. PATENT DOCUMENTS

| | | |
|---|---|---|
| 2,166,826 | 7/1939 | Shephard . |
| 2,457,469 | 12/1948 | Hillman . |
| 2,808,638 | 10/1957 | Filippi . |
| 2,930,111 | * 3/1960 | Clair ........................... 407/5 X |
| 2,955,349 | * 10/1960 | York ............................. 407/5 |
| 3,059,316 | * 10/1962 | Bader et al. ................. 407/5 X |
| 4,041,812 | 8/1977 | Jioio et al. . |
| 4,135,845 | 1/1979 | Rea . |
| 4,189,264 | 2/1980 | Kraemer . |
| 4,220,427 | 9/1980 | Kimura et al. . |
| 4,271,734 | 6/1981 | Kimura et al. . |
| 4,275,626 | 6/1981 | Gik . |
| 4,277,206 | 7/1981 | Hilton . |
| 4,414,870 | 11/1983 | Peterson, Jr. et al. . |
| 5,080,535 | 1/1992 | Hirano . |
| 5,704,734 | 1/1998 | Ashley et al. . |

FOREIGN PATENT DOCUMENTS

| | | | |
|---|---|---|---|
| 2258240 | * 8/1975 | (FR) | ................................ 407/5 |
| WO97/22429 | 6/1997 | (WO) . | |

* cited by examiner

*Primary Examiner*—Henry W. H. Tsai
(74) *Attorney, Agent, or Firm*—John J. Prizzi (57) ABSTRACT

A cutting insert which includes a holder that contains a pocket and a hard insert that has a rake surface. The hard insert is contained within the pocket so as to present a cutting edge. The cutting insert also includes a chipbreaker which comprises a plate with a bottom surface. The chipbreaker is attached to the cutting insert (or optionally to the holder) so that the plate is spaced above the rake surface of the hard insert a first distance forming a conduit for passage of the chips away from the cutting insert. The conduit is defined at least in part by the rake surface of the cutting insert and the bottom surface of the chipbreaker plate.

31 Claims, 6 Drawing Sheets

DETACHABLE CHIPBREAKER FOR A CUTTING INSERT

BACKGROUND

The invention pertains to a chipbreaker for use in conjunction with a metal cutting insert, as well as the combination of the chipbreaker and the metalcutting insert A cutting tool assembly for metal working (e.g., turning, milling and boring applications) typically comprises a shank, a head portion and one or more cutting inserts. The workpiece or cutting tool assembly is rotated in a chuck. The cutting insert contacts the workpiece and a part of the workpiece is generally removed as rolls, coils or stringers of metal. Sometimes, the roll or stringer of metal will not break so as to become very long, and possibly, become tangled together. Such a long coil is known in this art as a bird's nest. Unfortunately, this long tight curl, i.e., bird's nest, is in the work area and may become entangled with the chuck holding the work piece. The long tight coil may also become entangled with the lead screw on the lathe and cutting tool assembly. Such a long tight coil of metal if permitted to exist may decrease the useful life of the cutting tool assembly or damage the surface of the workpiece.

Further, for example, if the machine tool operator must stop the lathe and remove the coil or roll of metal from the vicinity of the workpiece and the cutting tool, there is a loss in production of the machine tool operator which results in an increase in the cost of production of the workpiece. If there is a long roll or coil of metal in the work area, the work area is less safe for the machine tool operator than if the metal removed from the workpiece is broken into small chips.

A side effect of breaking the coil of metal from the workpiece into smaller segments, i.e., chips, is a better finish on the completed workpiece since the metal coil does not work in between the cutting edge of the cutting insert and the workpiece.

Further, if the metal removed from the workpiece is one continuous coil or stringer, the metal is not useful for being recycled and melted in a furnace. For example, one barrel of broken ships from the metallic workpiece is equal in weight to about twenty to thirty barrels of unbroken chips. It is easier to bale one barrel of broken chips than it is to bale twenty to thirty barrels of unbroken chips. In a melting furnace the temperature is in the range of thirty-two hundred to thirty-three hundred degrees fahrenheit (3200° F.-3300° F.). If the chips are not baled, the chips burn and vaporize and the metal is lost. Therefore, it is necessary to bale the chips for efficient recycling.

It is very apparent that there are some significant advantages to breaking the long coil into smaller segments or chips. These advantages pertain to the overall efficiency of the performance of the cutting tool assembly, the quality of the surface finish of the workpiece, the safety of the operator, and the enhancement of the recycling of the chips.

Referring to the chipbreaker itself, there are two basic categories of chipbreakers. The first category pertains to a chipbreaker which is an integral part of the cutting insert. The second category pertains to a chipbreaker that is mechanically, but releasably, held on the top or rake face of the cutting insert. Both categories of chipbreakers function in basically the same fashion in that the metal coil is deflected from the cutting insert into the surface of the chipbreaker which causes the coil to curl back towards the workpiece. Curling of the coil causes it to work harden, and thus, break into a short segment (or chip) shortly after curling. The result is that a long coil of metal is not formed as a result of the metal removal process, but instead, shorter more manageable chips are formed from the metal removal process.

It can thus be appreciated that a chipbreaker, which functions to break the coil of metal into small segments (or chip), is an important feature of the overall metal removal process. By providing an effective chipbreaker, one lengthens the useful life of the cutting insert, enhances the productivity of the machine tool operator, makes the workplace safer for the operator, produces a better surface finish on the workpiece, and assists in the effective baling and subsequent melting of the metal removed from the workpiece.

SUMMARY

In one form thereof, the invention is a cutting insert assembly which comprises a holder containing a pocket, and a cutting insert having a rake surface wherein the cutting insert is contained within the pocket so as to present a cutting edge. The cutting insert assembly further includes a chipbreaker which comprises a plate with a bottom surface. The chipbreaker attaches to the insert so that the plate is spaced above the rake surface of the cutting insert a first distance, forming a conduit for passage of the chips away from the cutting insert wherein the conduit is defined at least in part by the rake surface of the cutting insert and the bottom surface of the chipbreaker plate.

In another form thereof, the invention is a chipbreaker for use in conjunction with a cutting insert assembly which has a holder containing a pocket and a cutting insert having a rake surface. The cutting insert is contained within the pocket so as to present a cutting edge. The chipbreaker is attached to the holder so that the plate is spaced above the rake surface of the cutting insert a first distance. There is a conduit for the passage of chips which is defined at least in part by the rake surface of the cutting insert and the bottom surface of the chipbreaker plate.

In still another form thereof, the invention is a method of removing metal from a workpiece using a cutting insert assembly comprising the steps of: providing a workpiece; providing a cutting insert assembly wherein the cutting insert assembly comprises a holder containing a pocket, and a cutting insert having a rake surface, the cutting insert being contained within the pocket so as to present a cutting edge, and a chipbreaker comprising a plate with a bottom surface, the plate being spaced above the rake surface of the cutting insert a first distance, and a conduit being defined at least in part by the rake surface of the cutting insert and the bottom surface of the chipbreaker plate; moving the workpiece relative to the cutting insert whereby the cutting edge engages the workpiece thereby removing a coil of metal from the workpiece; and the metal coil impacting at least a portion of the chipbreaker thereby breaking the metal coil into smaller segments.

BRIEF DESCRIPTION OF THE DRAWINGS

The following is a brief description of the drawings which form a part of the patent application.

DETAILED DESCRIPTION

Referring to the drawings there is illustrated a polycrystalline diamond (PCD) composite cutting insert generally designated as 10. Although the cutting insert 10 is illustrated as a PCD cutting insert, it should be appreciated that the cutting insert may be a polycrystalline cubic boron (PCBN} type of insert or a ceramic cutting insert (e.g., an alumina-based cutting insert or a silicon nitride-based cutting insert), a cermet cutting insert (e.g., titanium carbide-based cermet or a titanium carbonitride-based cermet) or a coated (or uncoated) cemented carbide cutting insert. Different cutting insert materials are set forth in U.S. Pat. No. 5,704,734 to Ashley et al. for a Metal Cutting Tool Assembly Having an Automatically Adjustable Chipbreaker wherein this patent is hereby incorporated by reference herein.

Figure 1:
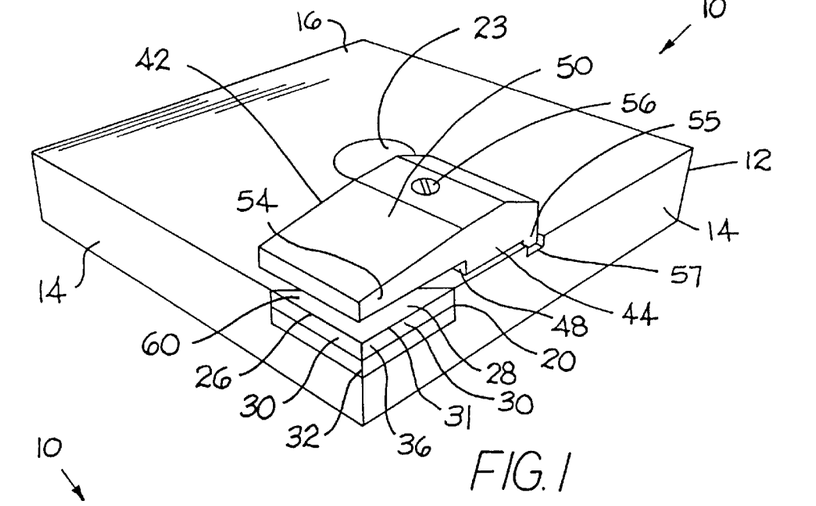
FIG. 1 is an isometric view of a specific embodiment of a polycrystalline diamond (PCD) cutting insert showing a chipbreaker.
Figure 2:
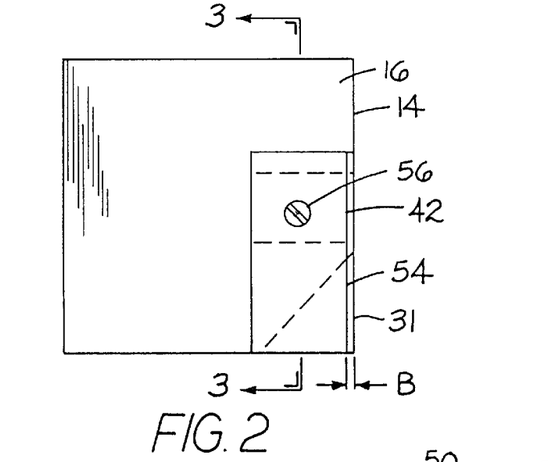
FIG. 2 is a top view of the specific embodiment of FIG. 1.

Cutting insert 10 includes a cutting insert base 12 generally made out of cemented tungsten carbide. Cutting insert base 12 has a rake surface 16 and flank surfaces 14. At one corner of the cutting insert base 12 there is a pocket 20. The pocket 20 has a generally triangular configuration. Cutting insert base 12 further contains a threaded bore 22 adjacent to the pocket 20 and a central hole 23.

Cutting insert 10 also includes a PCD blank 26 which is of a generally triangular shape so as to correspond to the configuration of the pocket. The PCD blank 26 has a PCD layer 36 on a cemented (cobalt) tungsten carbide backing 32. The PCD layer 36 presents a rake surface 28 and a flank surface 30. A cutting edge 31 is at the juncture of the rake surface 28 and the flank surface 30 of the PCD layer 36. The PCD blank 26 is brazed at its bottom surface (i.e., the bottom surface of the tungsten carbide-cobalt backing 32) to the top surface of the pocket 20.

Cutting insert 10 further includes a chipbreaker 42. Chipbreaker 42 includes a base portion 44 in which there is a bore 46. Base portion 44 also presents an interior surface 48. Chipbreaker 42 further includes a plate portion 50. Plate portion has an interior (or bottom) surface 52 and an exterior (or leading) edge 54. The chipbreaker 42 further includes a rearward downward projection 55 (see FIG. 3) extending from the base portion 44.

Figure 3:
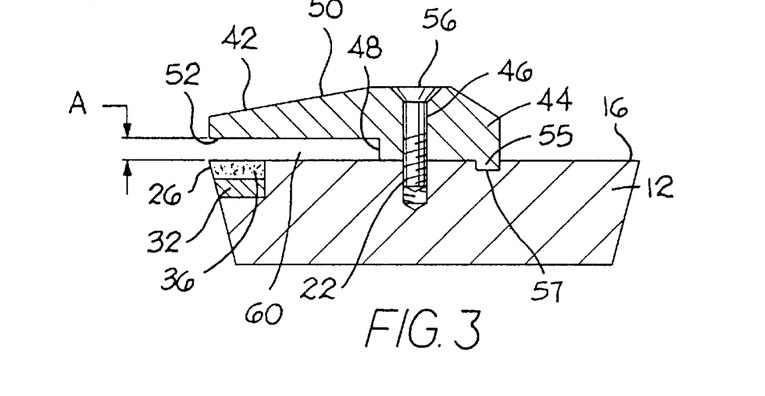
FIG. 3 is a cross-sectional view of the cutting insert of FIG. 2 taken along section line 3—3 in FIG. 2.

When assembled, the chipbreaker 42 is positioned so that the bore 46 is in alignment with the threaded bore 22. A threaded screw 56 passes through the bore 46 and into engagement with the threaded bore 22 in the cutting insert base 12. The screw 56 is tightened down so as to securely affix the chipbreaker 42 to the cutting insert base 12. The downward projection 55 is received within the a channel 57 in the rake surface 16 of the cutting insert base 12. The registration of the downward projection 55 in the channel 57 restricts (or at least helps restrict) the rotation of the chipbreaker 42 relative to the cutting insert base.

When affixed to the cutting insert base 12, the interior surface 52 of the chipbreaker plate portion 50 is spaced apart from the rake surface 28 of the PCD blank 26 a distance (or gap) "A" (see FIG. 3). The gap "A" is a function of the material removal rate (MMR) for the particular machining (or metal removal) application. The MMR is defined in cubic inches per minute (in$^3$/min) by the following formula:

(cutting speed [surface feet per minute])×(feed rate [inches per minute])×(depth of cut [inches])×12.

The MMR can thus be viewed to be a flow rate through a conduit. At the low range of the MMR (e.g., 1 to 2 in$^3$/minute), the gap "A" may be small in the order of about 200 micrometers ($\mu$m). At the high range of the MMR (e.g., about 25 in$^3$/minute), the gap "A" may be larger in the order of 1 millimeter (mm). The larger gap accommodates the increased flow of workpiece material so as to prevent (or at least reduce) any potential for jamming of the conduit (as described hereinafter) with workpiece material. The optimal setting of the gap "A" should be determined during the setup of the machine tool for each specific application; however, one exemplary setting for gap "A" is 500 micrometers ($\mu$m).

The exterior leading edge 54 of the chipbreaker plate portion 50 is spaced back from (or rearwardly of) the leading cutting edge 31 of the PCD blank 26 a distance "B" (see FIG. 2). Distance "B" must be great enough so as to allow for the cutting edge 31 to first contact the workpiece surface. However, the distance "B" should be less than the contact length of the chip on the rake face of the cutting insert, i.e., less than the socalled "footprint" of the chip as it contacts the rake face of the cutting insert. This will insure that the cut workpiece material will impact upon the bottom surface of the conduit (as described hereinafter) and break into smaller chips of a manageable size.

There is a conduit (or channel) 60 [see FIGS. 1 and 3] between the rake surface 28 of the PCD blank 26 and the interior surface 52 of the chipbreaker plate portion 50. It should be appreciated that the size of the conduit may vary depending upon the magnitude of the gap "A" between the interior surface 52 of the chipbreaker plate and the rake surface 28 of the PCD blank 26. As will be described hereinafter, because the chipbreaker is detachable, different chipbreakers with different dimensions may be selectively attached to the same cutting insert base 12 as to accommodate different applications.

Figure 4:
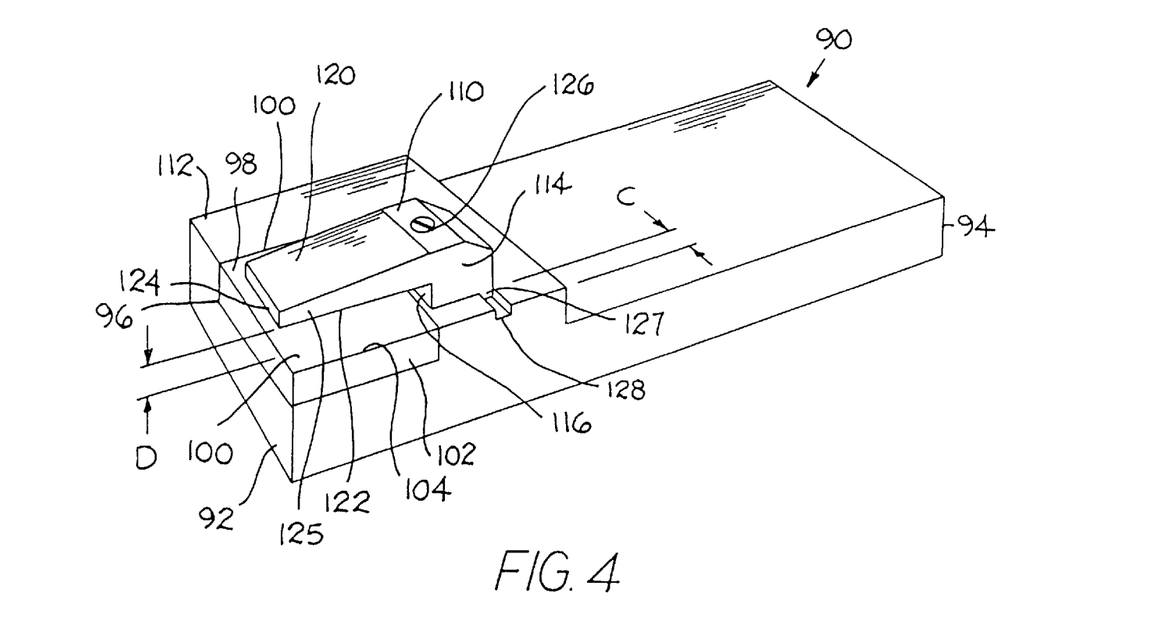
FIG. 4 is an isometric view of another specific embodiment wherein a chipbreaker is attached to the elongate tool holder which carries a cutting insert.

Referring to FIG. 4, there is illustrated an elongate tool holder generally designated as 90, and which has opposite ends 92 and 94. Holder 90 contains a pocket 96 at the one end 92 thereof. A cutting insert 98 is received and releasably fixed within the pocket 96. Cutting insert 98 has a rake face (or surface) 100 and a flank face (or surface) 102 wherein the rake face 100 and the flank face 102 intersect to form a cutting edge 104. Cutting insert 98 may be of most any type of cutting insert. For example, cutting insert 98 may be a PCD cutting insert, a cemented (cobalt) tungsten carbide (coated or uncoated), a cermet (coated or uncoated) a ceramic (coated or uncoated), or a superhard coated cutting insert such as a diamond coated cutting insert or a cubic boron nitride cutting insert. Cutting insert 98 may also be most any one of a wide variety of cutting insert geometries and may have a molded or ground chipbreaker geometry on its rake surface and/or roughened rake surface as previously described herein.

A chipbreaker 110 is affixed to the top surface 112 of the tool holder 90. Chipbreaker 110 has a base portion 114 in which there is a bore (not illustrated) and the base portion 114 also presents an interior surface 116. Chipbreaker 110 also has a plate portion 120 which has an interior surface 122. Plate portion 120 has an exterior surface 124 and a leading exterior surface 125.

When assembled, the chipbreaker 110 is positioned so that the bore in the base portion 114 is in general alignment with a threaded bore (not illustrated) in the tool holder 90 near the pocket 96. A screw (or fastener) 126 passes through the bore in the base portion 114 into engagement with the threaded bore so that when the screw 126 is tightened the chipbreaker 110 is securely attached to the tool holder 90. The chipbreaker 110 further includes a rearward downward projection 127 that is received in a channel 128 contained in the tool holder 90. The registration between the projection 127 and the channel 128 prevents (or at least helps restrict) the rotation of the chipbreaker relative to the tool holder.

In the position illustrated by FIG. 4, the exterior leading edge 125 of the chip breaker 110 is spaced inwardly of (or rearwardly of) the leading cutting edge 104 a distance "C". The exterior edge 124 of the chipbreaker 110 is positioned so as to be in the same general vertical plane as the flank face 102. The interior surface 122 of the chipbreaker 110 is also spaced a gap "D" above the rake (or top) face 100 of the cutting insert 98. The considerations for the distance "C" are the same as those of distance "B" set forth hereinabove. The considerations for the gap "D" are the same as those for the gap "A" set forth hereinabove. It can thus be appreciated that the specific embodiment of FIG. 4 provides for a tool holder-cutting insert-chipbreaker assembly which facilitates the breakage of coils or stringers of metal from the workpiece into small manageable pieces.

Figure 5:
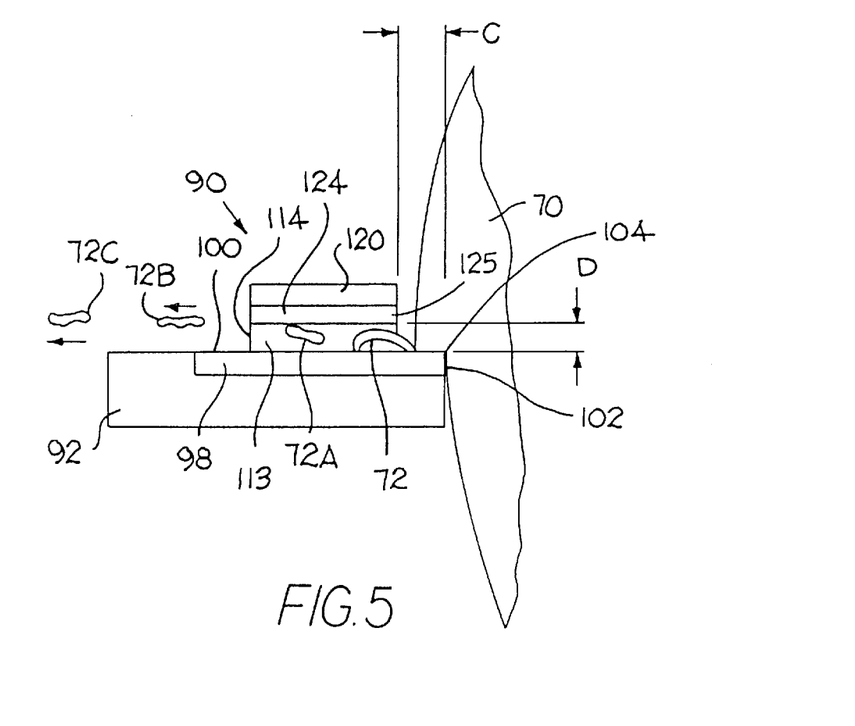
FIG. 5 is an end view of the cutting insert of FIG. 4 in engagement with the workpiece showing the removal of metal from the workpiece and the breaking of the metal coil into smaller chips.

FIG. 5 illustrates the operation of the cutting tool holder-cutting insert-chipbreaker assembly of FIG. 4. In this regard, the cutting insert 98 contacts the workpiece 70 so as to remove a coil of metal (or material) 72 therefrom. The coil 72 moves so as to impinge upon the chipbreaker 110, and more specifically one or both of the interior surfaces (116, 122) of the chipbreaker 110 so as to bend the coil of metal and cause it to break forming a chip 72A. The process is repeated so as to form a plurality of separate and distinct chips (72A, 72B and 72C) wherein these chips pass through a conduit 113 away from the cutting insert. The conduit 113 is defined by the structure of chipbreaker 110 which corresponds to the structure of chipbreaker 42 which defines conduit 60.

Figure 6:
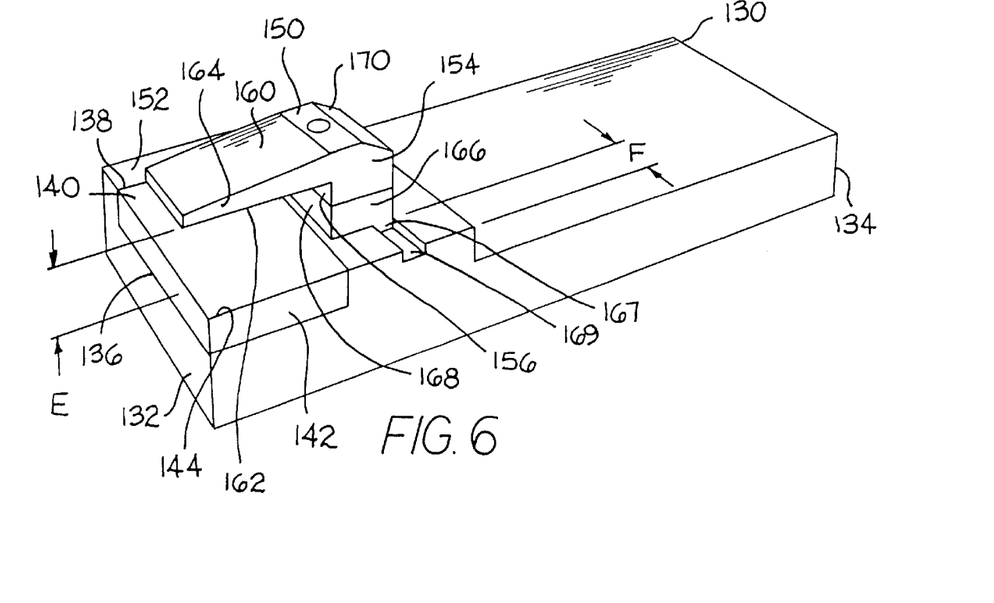
FIG. 6 is an isometric view of another specific embodiment wherein an adjustable chipbreaker is attached to the elongate tool holder, which carries a cutting insert, and gap ("E") between the chipbreaker and the rake face of the cutting insert is adjustable.

Referring to FIG. 6, there is illustrated another specific embodiment much like the embodiment of FIG. 4, except that the chipbreaker is adjustable (via one or more shims) so as to be able to vary the gap between the chipbreaker interior surface and the rake face of the cutting insert. Still referring to FIG. 6, there is shown an elongate tool holder 130 which has opposite ends 132 and 134. Tool holder 130 is preferably made of steel or another metallic alloy. Holder 130 contains a pocket 136 at the one end 132 thereof. A cutting insert 138 is received within the pocket 136. Cutting insert 138 has a rake face 140 and a flank face 142 wherein the rake face 140 and the flank face 142 intersect to form a leading cutting edge 144.

An adjustable chipbreaker 150 is affixed to the top surface 152 of the tool holder 130. Chipbreaker 150 has a base portion 154 in which there is a bore (not illustrated). The base portion 154 also presents an interior surface 156. Chipbreaker 150 also has a plate portion 160 which has an interior surface 162 and a leading exterior edge 164. Chipbreaker 150 further includes a shim 166 which has an interior surface 168 and a bore (not illustrated). Although only one shim is illustrated in FIG. 6, it should be appreciated that a plurality of shims may be used to adjust the magnitude of the gap "E" between the interior surface 162 of the chipbreaker 150 and the rake face 140 of the cutting insert 138.

When assembled, the chipbreaker 150 is positioned so that the bore in the base portion 154 and the bore in the shim 166 are in general alignment with a threaded bore (not illustrated) in the tool holder 130 near the pocket 136. A screw (or fastener) 170 passes through the bore in the base portion 154 and into engagement with the threaded bore so that when the screw 170 is tightened, the chipbreaker 150 is securely attached to the tool holder 130. The bottom shim 166 includes a rearward downward projection 167 that registers with corresponding channel 169 in the tool holder. The registration between the projection 167 and the channel 169 restricts (or at least helps restrict) the rotation of the chipbreaker 150 relative to the tool holder.

When in the position illustrated in FIG. 6, the exterior leading edge 164 of the chipbreaker 150 is offset from (or positioned rearwardly of) the leading cutting edge 144 of the cutting insert 138 a distance "F".

The considerations for gap "E" are the same as those for gap "A" discussed above. The considerations for distance "F" are the same as those for distance "B" discussed above. It can thus be appreciated that the embodiment of FIG. 6 provides for a tool holder-cutting insert-chipbreaker assembly which facilitates the breakage of coils or stringers of metal from the workpiece, and which also provides for an adjustability of the gap between the interior surface of the chipbreaker and the rake face of the cutting insert.

Figure 7A:
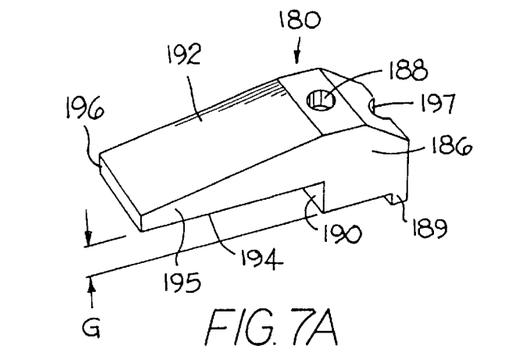
FIG. 7A through 7C are isometric views of a set of three chipbreakers wherein, when attached to the elongate tool holder, each chipbreaker provides for a gap (i.e., "G", "H" and "I") between the chipbreaker and the rake face of the cutting insert of a different dimension.
Figure 7B:
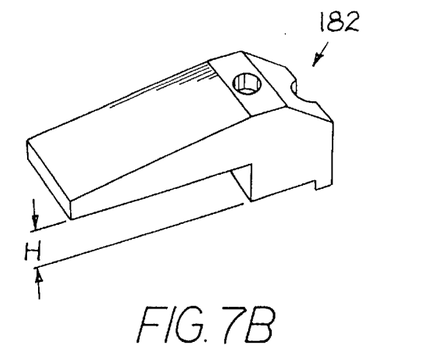
Figure 7C:
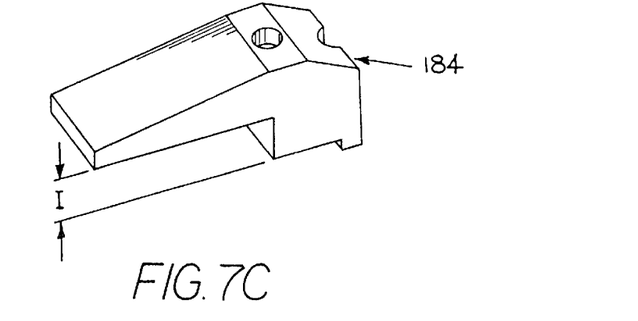

Referring to FIGS. 7A through 7C, there are illustrated three chipbreakers generally designated as 180, 182, and 184, respectively. These chipbreakers are essentially the same, except that the base portion of each chipbreaker is of a different size so as to provide for a variation of the magnitude of the gap between the interior surface of the chipbreaker and the rake face of the cutting insert. The description of chipbreaker 180 now follows, and will suffice for the description of the chipbreakers 182 and 184.

Chipbreaker 180 has a base portion 186 in which there is a bore 188. The base portion 186 also includes a downward projection 189. The base portion 186 also presents an interior surface 190. Chipbreaker 180 also has a plate portion 192 which has an interior surface 194 and a pair of exterior edges 195 and 196. Chipbreaker 180 contains a notch (or elongate channel) 197 in the rear surface thereof.

When the chipbreaker is attached to the tool holder, the notch 197 may register with a post (or projection) extending from the top surface of the tool holder. This registration between the notch and the post restricts, or at least helps restrict, the rotation of the chipbreaker relative to the tool holder. It should be appreciated that the projection 189 on the chipbreaker registers with a corresponding channel like that described in conjunction with chipbreaker 42 so as to help restrict the rotation of the chipbreaker relative to the tool holder.

The chipbreaker 180 is positioned with respect to an elongate tool holder like the chipbreaker of FIG. 4, for example. The chipbreaker 180 provides the same benefits as the chipbreaker in FIG. 4. The fact that the size (i.e., dimension) of the base portions (186) vary provide for an adjustability feature whereby the gap between the interior surface of the chipbreaker plate and the rake face of the cutting insert may vary. The chipbreaker 180 illustrated in FIG. 7A provides for a gap "G". The chipbreaker 182 illustrated in FIG. 7B provides for a gap "H". The chipbreaker 184 illustrated in FIG. 7C provides for a gap "I". As can be appreciated from these drawings, the magnitude of the gaps "G", "H", and "I" are different for each chipbreaker in that gap "G" is less than each one of gaps "H" and "I", and gap "H" is less than gap "I".

Figure 8:
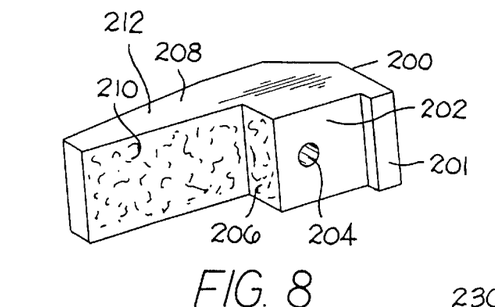
FIG. 8 is an isometric view of another embodiment of a chipbreaker showing the interior surface thereof in a roughened condition.

Referring to FIG. 8, there is illustrated another embodiment of a chipbreaker 200 wherein chipbreaker 200 has a base portion 202 in which there is a bore 204. Chipbreaker 200 also has a plate portion 208 which has an interior surface 210 and an exterior edge 212. The base portion 202 and the plate portion 208 also present an interior surface (206 and 210) which, as an optional feature, is roughened so as to enhance the chipbreaking capability of the chipbreaker. Roughness contemplated by the present invention for the roughened interior surfaces 206 and 210 of the chipbreaker include a range of between 15 to 125 microinches $R_a$ with a preferred range of between 25 to 125 microinches $R_a$ and a still more preferred range of between 40 and 80 microinches $R_a$.

The interior surfaces (206, 210) may in the alternative (or in addition) to the roughened surface present topographical features (e.g., bumps, dimples, grooves, ridges and the like) that facilitate the chipbreaker capability of the chipbreaker. It is thus apparent that when attached to a tool holder, for example, the chipbreaker 200 provides the same benefits as does the chipbreaker of FIG. 4 and further includes providing an enhanced chipbreaker capability due to the roughness and/or other topography of the interior surface 210 of the plate portion 208. The chipbreaker 200 includes a rearward downward projection 201 which registers with a corresponding channel in the structure to which the chipbreaker is attached so as to restrict (or at least helps restrict) the rotation of the chipbreaker.

Figure 9:
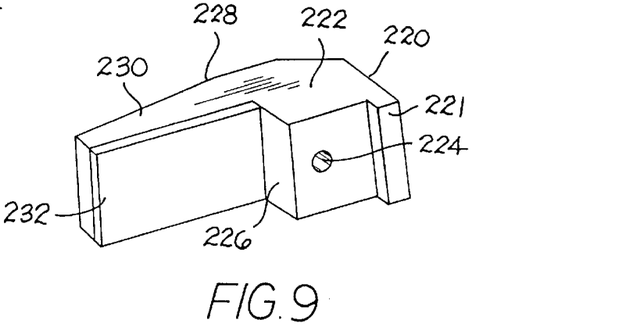
FIG. 9 is an isometric view of still another embodiment of a chipbreaker showing the interior surface wherein the interior surface comprises a layer of cemented (cobalt) tungsten carbide.

Referring to FIG. 9, there is illustrated another embodiment of a chipbreaker 220 wherein chipbreaker 220 has a base portion 222 in which there is a bore 224. The base portion 222 also presents an interior surface 226. Chipbreaker 220 also has a wear-resistant plate or layer portion 228 which has a substrate 230 and a layer 232 of wear-resistant material such as, for example, cemented (cobalt) tungsten carbide. The use of the cemented tungsten carbide layer 232 (or a layer of chemical vapor deposited diamond, PCD, polycrystalline cubic boron nitride, or other refractory materials and combinations thereof) enhances the longevity of the chipbreaker 220. Like for the chipbreaker of FIG. 8, it is apparent that when attached to a tool holder the chipbreaker 220 provides the same benefits as does the chipbreaker of FIG. 4 and further includes providing an enhanced chipbreaking capability and durability due to the wear resistance of the cemented tungsten carbide layer 232.

The chipbreaker 220 includes a rearward downward projection 221 which registers with a corresponding channel in the structure to which the chipbreaker is attached so as to restrict the rotation of the chipbreaker.

Figure 10:
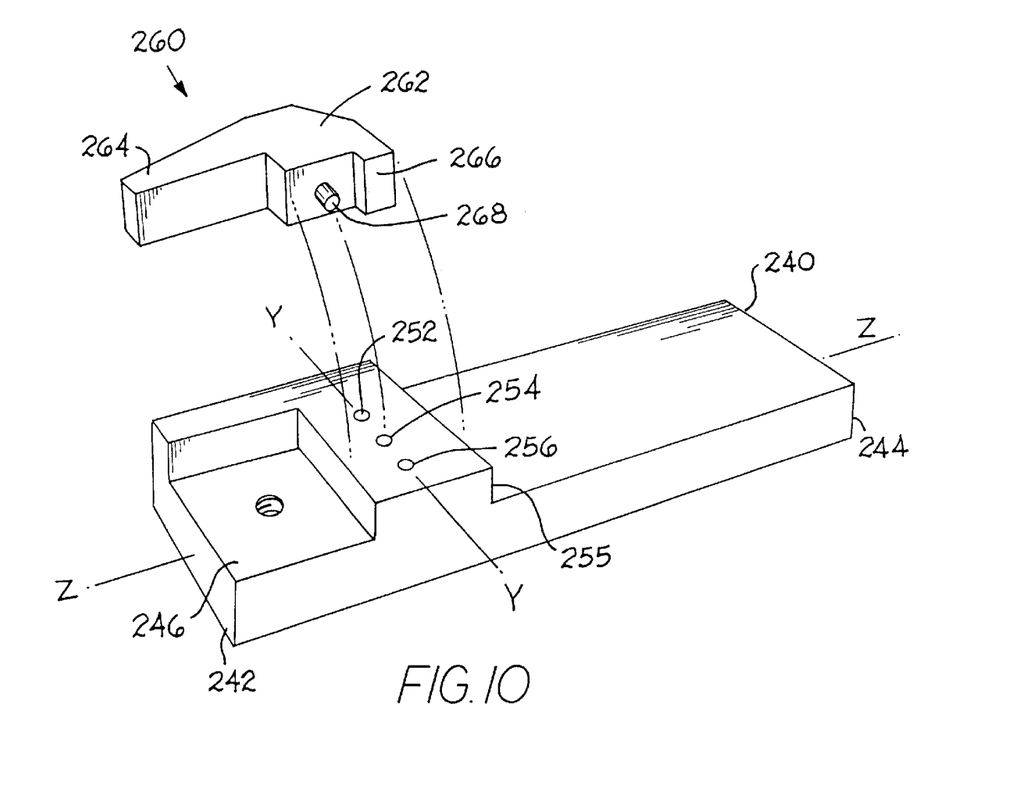
FIG. 10 is an isometric view of an embodiment of an elongate tool holder (without a cutting insert or a chipbreaker attached thereto) having a trio of transversely-oriented threaded bores therein.

Referring to FIG. 10, there is illustrated an elongate tool holder 240 which has opposite ends 242 and 244. Holder 240 contains a pocket 246 at the one end 242 thereof. A cutting insert (not illustrated) may be received within the pocket 246. There are a plurality of threaded bores 252, 254 and 256 in the tool holder adjacent to the pocket 246. These three bores (252, 254, 256) are in general alignment along a line Y—Y generally perpendicular to the longitudinal axis Z—Z of the tool holder.

FIG. 10 further depicts a chipbreaker 260 which has a base portion 262 and a plate portion 264. The base portion 262 includes downward elongate projection 266 and a post 268. These bores (252, 254, 256) accommodate the post 268 that positions the chipbreaker with respect to the holder. It can be seen that a chipbreaker may be positioned to the tool holder at any one of three positions along line Y—Y depending upon which bore (252, 254, 256) receives the fastener. By positioning the chipbreaker at any one of these three locations, the distance the exterior edge of the plate portion of the chipbreaker is offset from the cutting edge of the cutting insert may vary. It should be appreciated that the projection 266 engages the shoulder 255 of the tool holder so as to help prevent rotation of the chipbreaker with respect to the tool holder.

Figure 11:
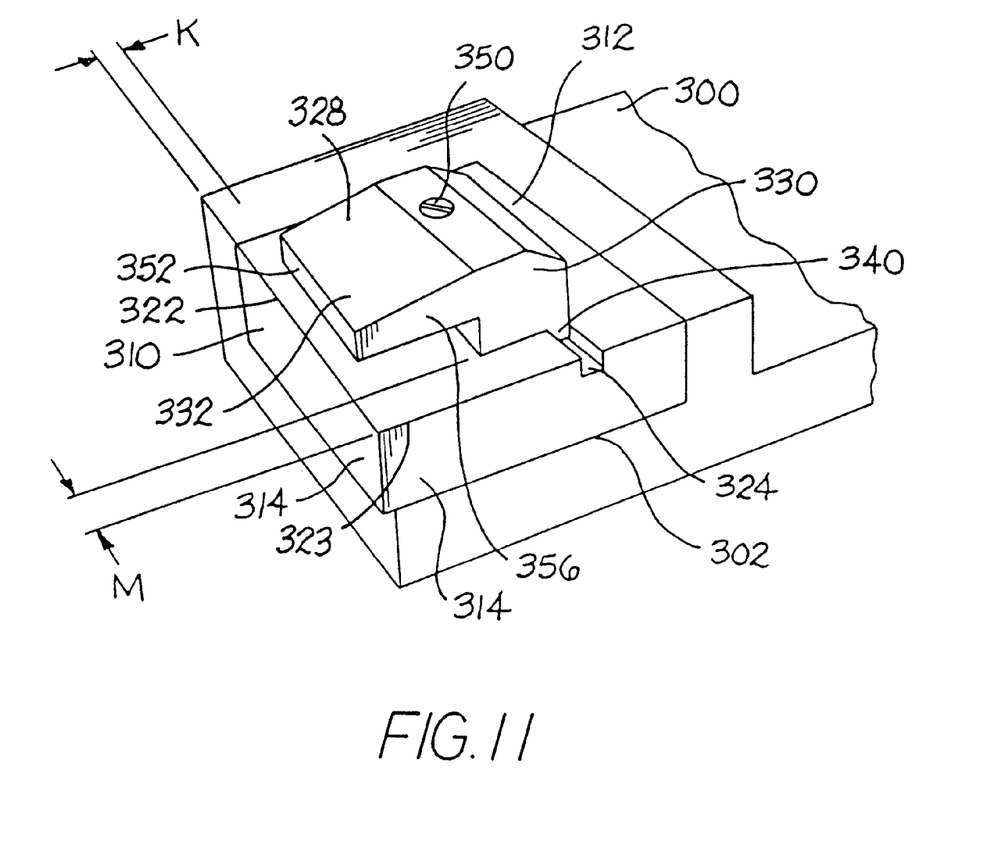
FIG. 11 is an isometric view of an embodiment of a chipbreaker attached to the cutting insert.
Figure 12:
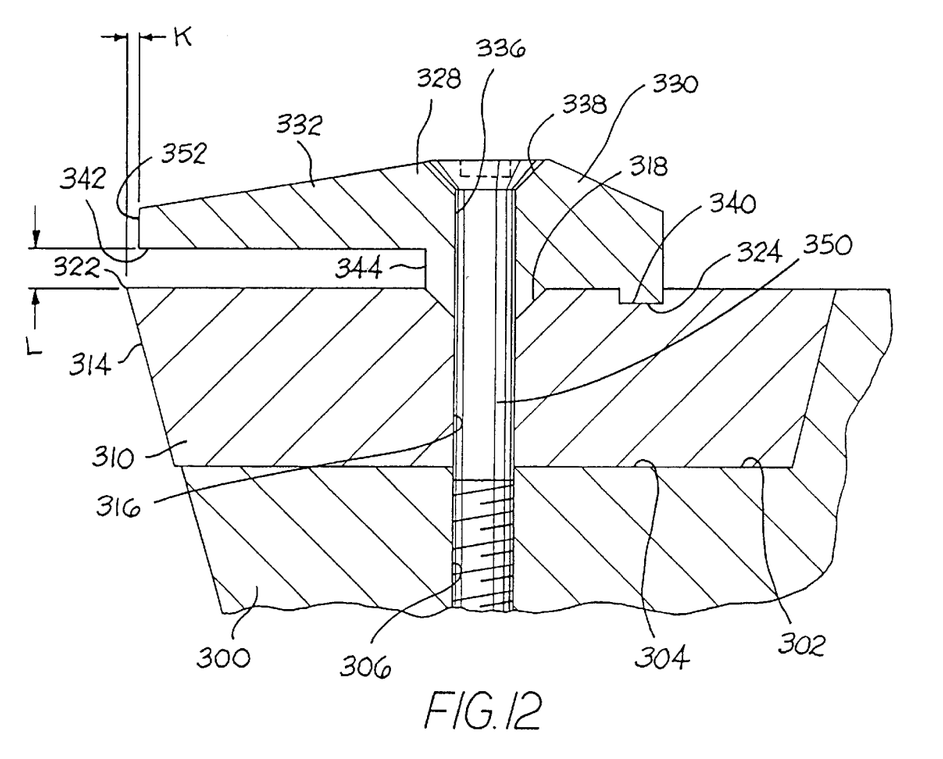
FIG. 12 is a cross-sectional view of the structure shown in FIG. 11

Referring to FIGS. 11 and 12 there is illustrated the axially forward portion of a tool holder 300 which has a pocket 302 contained therein. The pocket 302 has a bottom surface 304 which contains a threaded aperture 306 therein. There is a cutting insert 310 which as a rake surface 312 and flank surfaces 314. The rake surface 312 contains a central aperture 316 with a countersunk portion 318. There is a cutting edge 322 at the intersection of the rake surface 312 and one of the flank surfaces 314. There is another cutting edge 323 at the intersection of the other flank surface 314 and the rake surface 312. The rake surface 312 includes a channel 324.

There is a chipbreaker 328 which has a base portion 330 and a plate portion 332. The chipbreaker 328 contains an aperture 336 with a countersunk portion 338 at the top end thereof. The base portion 330 includes a rearward downward projection 340. The plate portion 332 has an interior surface 342 and the base portion 330 has an interior surface 344. Like for the interior surfaces (206 and 210) of chipbreaker 200, the interior surfaces (342 and 344) may be roughened and/or have a topography that enhances the chipbreaking capability of the chipbreaker 328.

To attach the chipbreaker 328, the cutting insert 310 is positioned so that the central aperture 316 is in alignment with the threaded aperture 306 in the bottom surface of the pocket 302, and the chipbreaker 328 is positioned so that the aperture 336 is in alignment with the central aperture 316 of the cutting insert 310. A screw 350 is then passed through these apertures (316 and 336) so as to engage the threaded aperture 306 in the tool holder. The screw 350 is tightened so as to secure the cutting insert and the chipbreaker to the pocket of the tool holder.

It should be appreciated that the distal edge 352 of the plate portion 332 is recessed (or offset) from the cutting edge 322 a distance "K". The interior surface 342 of the plate portion 332 is spaced a distance "L" (see FIG. 12) above the rake surface of the cutting insert. The one exterior edge 356 of the plate portion 332 is spaced inwardly of (or offset from) the cutting edge 323 a distance "M" (see FIG. 11).

Because the chipbreaker presents two edges that offset from their respective cutting edges, the chipbreaker is functional with either one of the cutting edges (322, 323).

The patents and other documents identified herein are hereby incorporated by reference herein.

Other embodiments of the invention will be apparent to those skilled in the art from a consideration of the specification or practice of the invention disclosed herein. It is intended that the specification and examples be considered as illustrative only, with the true scope and spirit of the invention being indicated by the following claims.

What is claimed is:

1. A cutting insert assembly which comprising:
   a holder containing a pocket;
   a cutting insert having a rake surface, the cutting insert being contained within the pocket so as to present a cutting edge;
   a chipbreaker comprising a plate with a bottom surface, the chipbreaker being attached to the cutting insert so that the plate being spaced above the rake surface of the cutting insert a first distance forming a conduit for passage of the chips through the conduit in a direction generally parallel to the rake surface of the cutting insert and away from the cutting edge of the cutting insert wherein the conduit being defined at least in part by the rake surface of the cutting insert and the bottom surface of the chipbreaker plate.

2. The cutting insert assembly of claim 1 wherein the chipbreaker further including a base portion integral with the plate, and the base portion containing a passage, and the cutting insert containing a threaded bore adjacent to the pocket, and a fastener passing through the passage and engaging the threaded bore so as to affix the chipbreaker to the cutting insert.

3. The cutting insert assembly of claim 1 wherein the plate having an exterior leading edge, and the exterior leading edge being spaced rearwardly of the cutting edge of the cutting insert.

4. The cutting insert assembly of claim 1 wherein the cutting insert is polycrystalline diamond.

5. The cutting insert assembly of claim 1 wherein the cutting insert is polycrystalline cubic boron nitride.

6. The cutting insert assembly of claim 1 wherein the cutting insert is a cermet.

7. The cutting insert assembly of claim 1 wherein the rake surface of the cutting insert presents a roughened surface.

8. The cutting insert assembly of claim 1 wherein the bottom surface of the plate being roughened so as to present a surface roughness.

9. The cutting insert assembly of claim 1 wherein the bottom surface of the plate comprising a hard material.

10. The cutting insert assembly of claim 1 wherein the chipbreaker being adjustable relative to the cutting insert so as to vary the gap between the chipbreaker and the rake surface of the cutting insert.

11. The cutting insert assembly of claim 10 wherein the plate having an exterior edge, the exterior edge being spaced rearwardly of the cutting edge of the cutting insert, and the chipbreaker being adjustable so as to vary the distance the exterior edge is spaced rearwardly of the cutting edge.

12. The cutting insert assembly of claim 1 wherein the chipbreaker further includes a base portion integral with the plate, and the base portion having a rearward downward projection, the rake face of the cutting insert containing a channel that receives the rearward downward projection upon assembly of the chipbreaker to the cutting insert.

13. A chipbreaker for use in conjunction with a cutting insert assembly which has a holder containing a pocket and a cutting insert having a rake surface and at least two flanks surfaces, and the cutting insert being contained within the pocket so as to present a cutting edge, the chipbreaker comprising:
   a plate with a bottom surface wherein the bottom surface generally faces the rake surface of the cutting insert, the plate being spaced above the rake surface of the cutting insert a first distance, and a conduit having opposite open ends and being defined at least in part by the rake surface of the cutting insert and the bottom surface of the chipbreaker plate.

14. The chipbreaker of claim 13 wherein the plate having an exterior edge, and the exterior edge being spaced rearwardly of the cutting edge of the cutting insert.

15. A chipbreaker for use in conjunction with a cutting insert assembly which has a holder containing a pocket and a cutting insert having a rake surface and at least two flank surfaces, and the cutting insert being contained within the pocket so as to present a cutting edge, the chipbreaker comprising:
   a plate with a bottom surface wherein the bottom surface generally faces the rake surface of the cutting insert, the plate being spaced above the rake surface of the cutting insert a first distance, and a conduit having opposite ends and being defined at least in part by the rake surface of the cutting insert and the bottom surface of the chipbreaker plate;
   the plate having an exterior edge, and the exterior edge being spaced rearwardly of the cutting edge of the cutting insert; and
   wherein the plate having a distal edge, and the distal edge being in the same vertical plane as its corresponding flank surface of the cutting insert.

16. The chipbreaker of claim 15 wherein the cutting insert having a second cutting edge, and the distal edge of the plate being spaced reawardly of the second cutting edge.

17. A chipbreaker for use in conjunction with a cutting insert assembly which has a holder containing a pocket and a cutting insert having a rake surface and at least two flank surfaces, and the cutting insert being contained within the pocket so as to present a cutting edge, the chipbreaker comprising:
   a plate with a bottom surface wherein the bottom surface generally faces the rake surface of the cutting insert, the plate being spaced above the rake surface of the cutting insert a first distance, and a conduit having opposite open ends and being defined at least in part by the rake surface of the cutting insert and the bottom surface of the chipbreaker plate; and
   wherein the chipbreaker further including a base portion integral with the plate, and the base portion containing a passage, and the cutting insert containing a threaded bore adjacent to the pocket, and a fastener passing through the passage and engaging the threaded bore so as to affix the chipbreaker to the cutting insert.

18. The chipbreaker of claim 17 wherein the base portion further includes a rearward downward projection.

19. The chipbreaker of claim 17 wherein the base portion further includes a notch.

20. A chipbreaker for use in conjunction with a cutting insert assembly which has a holder containing a pocket and a cutting insert having a rake surface and at least two flank surfaces, and the cutting insert being contained within the pocket so as to present a cutting edge, the chipbreaker comprising:
   a plate with a bottom surface wherein the bottom surface generally faces the rake surface of the cutting insert, the plate being spaced above the rake surface of the cutting insert a first distance, and a conduit having opposite open ends and being defined at least in part by the rake surface of the cutting insert and the bottom surface of the chipbreaker plate; and wherein the chipbreaker being attached to the cutting insert, and the chipbreaker further including a base portion integral with the plate, and the base portion containing a passage whereby a fastener passing through the passage and engaging a threaded bore in the cutting insert so as to affix the chipbreaker to the cutting insert.

21. A cutting insert assembly comprising:

a holder containing a pocket;

a cutting insert having a rake surface wherein the cutting insert being contained within the pocket so as to present a cutting edge; and a chipbreaker comprising a plate with a bottom surface, the chipbreaker being attached to the holder so that the plate is spaced above the rake surface of the cutting insert a first distance forming a conduit for passage of the chips through the conduit in a direction generally parallel to the rake surface of the cutting insert and away from the cutting edge of the cutting insert wherein the conduit being defined at least in part by the rake surface of the cutting insert and the bottom surface of the chipbreaker plate.

22. The cutting insert assembly of claim 21 wherein the bottom surface of the plate being roughened so as to present a surface roughness.

23. The cutting insert assembly of claim 21 wherein the bottom surface of the plate comprising a hard material.

24. The cutting insert assembly of claim 21 wherein the chipbreaker being adjustable relative to the cutting insert so as to vary the gap between the chipbreaker and the rake surface of the cutting insert.

25. The cutting insert assembly of claim 24 wherein the plate having an exterior edge, the exterior edge being spaced rearwardly of the cutting edge of the cutting insert, and the chipbreaker being adjustable so as to vary the distance the exterior edge is spaced rearwardly of the cutting edge.

26. A cutting insert assembly comprising:

a holder containing a pocket;

a cutting insert having a rake surface wherein the cutting insert being contained within the pocket so as to present a cutting edge;

a chipbreaker comprising a plate with a bottom surface, the chipbreaker being attached to the holder so that the plate is spaced above the rake surface of the cutting insert a first distance forming a conduit for passage of the chips through the conduit in a direction generally parallel to the rake surface of the cutting insert and away from the cutting edge of the cutting insert wherein the conduit being defined at least in part by the rake surface of the cutting insert and the bottom surface of the chipbreaker plate; and wherein the chipbreaker having a base portion, the base portion having a rearward downward projection, the rake face of the cutting insert containing a channel that receives the rearward downward projection upon assembly of the chipbreaker to the cutting insert.

27. A method of removing metal from a workpiece using a cutting insert assembly comprising the steps of:

providing a workpiece;

providing a cutting insert assembly wherein the cutting insert assembly comprises a holder containing a pocket, and a cutting insert having a rake surface, the cutting insert being contained within the pocket so as to present a cutting edge, and a chipbreaker comprising a plate with a bottom surface, the plate generally facing the rake surface of the cutting insert and being spaced above the rake surface of the cutting insert a first distance, and a conduit having opposite open ends and being defined at least in part by the rake surface of the cutting insert and the bottom surface of the chipbreaker plate;

moving the workpiece relative to the cutting insert whereby the cutting edge engages the workpiece thereby removing a coil of metal from the workpiece; and the metal coil impacting at least a portion of the chipbreaker thereby breaking the metal coil into smaller segments.

28. The method of claim 27 further including, prior to the impacting step, the step of passing the metal coil through at least a portion of the conduit.

29. The method of claim 27 wherein the chipbreaker being attached to the holder.

30. The method of claim 27 wherein the rake surface of the cutting insert and the bottom surface of the chipbreaker each being roughened to a surface roughness between about 15 and about 125 microinches $R_a$.

31. A method of removing metal from a workpiece using a cutting insert assembly comprising the steps of:

providing a workpiece;

providing a cutting insert assembly wherein the cutting insert assembly comprises a holder containing a pocket, and a cutting insert having a rake surface, the cutting insert being contained within the pocket so as to present a cutting edge, and a chipbreaker being attached to the cutting insert and comprising a plate with a bottom surface, the plate generally facing the rake surface of the cutting insert and being spaced above the rake surface of the cutting insert a first distance, and a conduit having opposite open ends and being defined at least in part by the rake surface of the cutting insert and the bottom surface of the chipbreaker plate;

moving the workpiece relative to the cutting insert whereby the cutting edge engages the workpiece thereby removing a coil of metal from the workpiece; and the metal coil impacting at least a portion of the chipbreaker thereby breaking the metal coil into smaller segments.

* * * * *